US 11,349,743 B2

United States Patent
Kleider et al.

(10) Patent No.: US 11,349,743 B2
(45) Date of Patent: May 31, 2022

(54) MACHINE LEARNING TRAINING SYSTEM FOR IDENTIFICATION OR CLASSIFICATION OF WIRELESS SIGNALS

(71) Applicant: General Dynamics Mission Systems, Inc., Fairfax, VA (US)

(72) Inventors: John Kleider, Fairfax, VA (US); Joao Baiense, Fairfax, VA (US); Chris Morgan, Fairfax, VA (US)

(73) Assignee: General Dynamics Mission Systems, Inc., Fairfax, VA (US)

( * ) Notice: Subject to any disclaimer, the term of this patent is extended or adjusted under 35 U.S.C. 154(b) by 336 days.

(21) Appl. No.: 16/746,494

(22) Filed: Jan. 17, 2020

(65) Prior Publication Data
US 2020/0252318 A1 Aug. 6, 2020

Related U.S. Application Data

(60) Provisional application No. 62/800,916, filed on Feb. 4, 2019.

(51) Int. Cl.
*H04L 43/02* (2022.01)
*H04L 43/10* (2022.01)
(Continued)

(52) U.S. Cl.
CPC .......... *H04L 43/10* (2013.01); *G06K 9/6289* (2013.01); *G06N 20/00* (2019.01)

(58) Field of Classification Search
CPC .... H04B 17/18; H04B 17/27; H04B 17/3913; H04B 17/0085; G06K 9/6289;
(Continued)

(56) References Cited

U.S. PATENT DOCUMENTS 8,295,341 B2 * 10/2012 Bose ................ H04L 27/0008
375/232
8,494,989 B1 7/2013 Haan et al.
(Continued)

FOREIGN PATENT DOCUMENTS

WO 2016096308 A1 6/2016

OTHER PUBLICATIONS

Youssef et al., Machine Learning Approach to RF Transmitter Identification, IEEE, 9 pages, Dec. 2018.*
(Continued)

*Primary Examiner* — Frank Duong
(74) *Attorney, Agent, or Firm* — LKGlobal | Lorenz & Kopf, LLP (57) ABSTRACT

A signal generator outputs a reference signal corresponding to at least one wireless signal according to the predefined signal encoding to a channel emulator processor. The channel emulator processor is programmed to use at least one synthesized channel parameter and the reference signal to produce and store a perturbed signal as data for training machine learning and artificial intelligence systems. The synthesized channel parameter is synthesized using a channel synthesizer processor programmed to: ingest map elevation data, reference a transmitter and a receiver to the map elevation data, and perform ray tracing of a representative signal between the transmitter and the receiver, while applying at least one predetermined perturbation property to synthesize at least one channel parameter.

20 Claims, 8 Drawing Sheets

(51) Int. Cl.
*G06N 20/00* (2019.01)
*G06K 9/62* (2022.01)

(58) Field of Classification Search
CPC ..... G06N 20/00; H04L 25/0254; H04L 41/16; H04L 43/10; H04N 21/4662; H04N 21/4666
See application file for complete search history.

(56) References Cited

U.S. PATENT DOCUMENTS

| | | | |
|---|---|---|---|
| 9,377,520 B2 | 6/2016 | Westcott et al. | |
| 9,886,945 B1 | 2/2018 | Sieracki | |
| 10,003,483 B1* | 6/2018 | Migliori | H04L 27/0012 |
| 10,915,833 B2* | 2/2021 | Ho | G06N 20/00 |
| 10,944,440 B2* | 3/2021 | Calabro | G06N 3/0454 |
| 10,985,955 B2* | 4/2021 | Chen | G06K 9/6292 |
| 2018/0308013 A1 | 10/2018 | O'Shea | |

OTHER PUBLICATIONS

O'Shea et al., Convolutional Radio Modulation Recognition Networks, arXiv, 15 pages, Jun. 10, 2016.*

Kim et al., Deep Neural Network-based Automatic Modulation Classification Technique, IEEE, 4 pages, 2016.*

Ali et al., Unsupervised feature learning and automatic modulation classification using deep learning model, ELSEVIER, 10 pages, Sep. 18, 2017.*

Kim S-C et al, Radio Propagation Measurements and Prediction Using Three-Dimensional Ray Tracing in Urban Environments at 908 MHZ and 1.9 GHZ, IEEE Transactions on Vehicular Technology, IEEE Service Center, Piscataway, New Jersey, US, vol. 48, No. 3, May 1, 1999.

* cited by examiner

MACHINE LEARNING TRAINING SYSTEM FOR IDENTIFICATION OR CLASSIFICATION OF WIRELESS SIGNALS

CROSS-REFERENCE TO RELATED APPLICATIONS

This application claims priority under 35 U.S.C. § 119(e) to U.S. Provisional Patent Application No. 62/800,916, entitled "Real-World Machine Learning Systems and Method for Identification or Classification of Wireless signals, Equipment or Emission Entities," filed Feb. 4, 2019, the contents of which are hereby incorporated by reference in its entirety.

TECHNICAL FIELD

The disclosure relates generally to artificial intelligence and machine learning systems for identifying or classifying how wireless signals have been modulated and encoded. More specifically, the disclosure relates to providing training data for such machine learning systems.

BACKGROUND

This section provides background information related to the present disclosure which is not necessarily prior art.

There are scores if not hundreds of different modulation modes and encoding schemes used in wireless communication today, and the numbers of modes and schemes are growing. When an encoded signal is observed at a particular frequency within a frequency spectrum it is often difficult to determine what particular encoding scheme has been used. Discovery through trial and error is time consuming, and sometimes fruitless, if the signal has been perturbed or distorted while traveling through the propagation medium or channel. In this regard, perturbations can also be caused as the signal travels through hardware/software processes, such as filtering or other processes that affect the signal in any way.

It would be desirable to employ a trained machine learning system, such as a neural network system, to identify or classify the mode and encoding scheme of an unknown transmission, however trained machine learning systems will be successful only if properly trained using an adequate quantity of good training data. Unfortunately, there a dearth of suitable training data for use in training and subsequent testing of wireless signals. While at any given time there are likely many different types of wireless signals propagating throughout the radio frequency spectrum, such signals in the wild are rarely suitable for training machine learning systems because they have not been labeled according mode and encoding scheme by a reliable curator, and because they have undergone perturbation and distortion during propagation, the effects of which cannot be readily reversed after the fact, or sufficiently characterized to produce reliable and robust truth data for training data generation.

SUMMARY

The disclosed training system is designed to address the dearth of good training data for developing machine learning systems that can quickly and reliably identify and classify the modulation modes and encoding schemes of various wireless signals, such as electromagnetic signals (e.g., radio and optical signals, including infrared and ultraviolet). While the disclosed training system is described in connection with wireless signals using electromagnetic energy, such as at radio and optical frequencies, the disclosed techniques are also applicable to audible signals sent through a propagating medium, such a SONAR signals sent through water, or ultrasonic signals sent through air. The disclosed training system can also be used to train a machine learning system that analyzes signals sent over or guided by a transmission line or waveguide.

The disclosed system uses real-world measurements to predict channel perturbation distortions and channel behavioral parameters to distort generated signals prior to training and subsequent testing of a machine learning system, such as a neural network. In addition to real-world signal measurements, the disclosed system also uses digital terrain elevation data (DTED) or other suitable digital elevation map data to predict channel perturbation distortions and behavioral parameters. To extract this information from the digital terrain elevation data ray tracing is used, combined with environmental properties (such as diffusion, diffraction, reflection and attenuation properties of the environment).

The disclosed system augments synthesized modulation data with or without DTED-based channel perturbations, combined with real-world measured signal data perturbed or not perturbed with real-world channel distortions and/or DTED-based channel perturbations. Hardware/software perturbations may also be introduced in the training process to produce more robust, higher-performing classification/identification systems.

The disclosed system is capable of distorting and/or augmenting common channel perturbations (carrier frequency offset, timing offsets (large and/or small) sampling rate mismatch, sampling rate offset, jamming, interference, additive white Gaussian noise) with real-world predicted channel distortions (with given or estimated power delay profiles, delay spreads, complex impulse responses, etc.) and/or DTED-based channel distortions (with given or estimated power delay profiles, delay spreads, complex impulse response, etc.).

According to one aspect of the disclosed system, an apparatus and method is provided to train a machine learning system to identify and/or classify at least one wireless signal of the type having at predefined modulation encoding scheme. A signal generator outputs a reference signal corresponding to the wireless signal according to the predefined modulation encoding. A channel synthesizer processor is programmed to ingest map elevation data, reference a transmitter and a receiver to the map elevation data, and perform ray tracing of a representative signal between the transmitter and the receiver, while applying at least one predetermined perturbation property to synthesize at least one channel parameter. A channel emulator processor is programmed to use the at least one synthesized channel parameter and the reference signal to produce and store a perturbed signal as data for training the machine learning system.

Also disclosed is a method of modeling a signal communication channel using a channel synthesizer processor to ingest map elevation data, reference a transmitter and a receiver to the map elevation data, and perform ray tracing of a representative signal between the transmitter and the receiver, while applying at least one predetermined perturbation property to synthesize at least one channel parameter. The synthesized channel parameter is supplied to a channel emulation processor programmed to receive an input signal and to perturb the input signal using the at least one synthesized channel parameter. This map data can also be used to emulate real-world interference and/or jamming signals incident on transmitter and receiver systems and/or networks.

BRIEF DESCRIPTION OF THE DRAWINGS

The drawings described herein are for illustrative purposes only of selected embodiments and not all possible implementations. Thus the particular choice of drawings is not intended to limit the scope of the present disclosure.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

During the dawn of the radio communication age, messages were initially sent by keying a spark gap transmitter and later by keying a continuous wave (CW) radio frequency oscillator on and off using a suitable code, such as the Morse code. Soon thereafter engineers learned to modulate amplitude of the radio frequency wave with an audio signal, and voice communication using amplitude modulation (AM) became popular. Somewhat later, engineers began using the audio signal to modulate the frequency of the radio frequency wave, and FM radio was born. These CW, AM and FM modes are still in use today. The basic nature of these three modes are each quite different, so it is not too difficult to discriminate one from the other.

However, the advent of digital technology spawned a multitude of different digital communication modes, many of which work by modulating the of the radio frequency wave according to a predetermined encoding scheme. Example modulation modes include, frequency modulation, phase modulation, amplitude modulation, amplitude and phase modulation, spread-spectrum modulation techniques, and the like. Many different encoding schemes have evolved over the years, typically motivated by the desire to increase message throughput and reliability. Indeed, today there are scores, if not hundreds, of different digital modes in popular use, each optimized to address a particular message requirement or signal propagation challenge. Thanks to the rapid growth of digital communication technology, it is no longer a simple prospect to discriminate one mode from another. For one thing, many of the digital modes share a similar frequency shift keyed (FSK), or phase shift keyed (PSK) modulation style. Thus to distinguish one mode from another requires looking deeper into what the actual encoded signals look like or how they behave.

To make matters more difficult, the signal path from source to destination is rarely free from interference. En route signals may fully or partially collide with reflecting surfaces, bend while passing through refractive media, diffract around edges, or lose strength giving up energy to absorptive materials, of which much of the Earth is made. Signals reflecting from surfaces can split into multiple different paths, and then later recombine constructively or destructively. Passing through a medium, initially horizontally polarized signals can become twisted into vertically polarized signals, or unpredictably somewhere in between. Some signals that oscillate near the resonance of water molecules may lose energy passing through fog or rain clouds. These are just some examples.

In addition to perturbation of the signals themselves, there can also be added noise from quite a few different sources. Celestial noise is ever-present, with the Sun being a dominant contributor. Add to this, atmospheric noise from lightning-induced static crashes, manmade noise, such as impulse noise from spark plugs, radio frequency emissions from plasma TVs, wall chargers, grow lights, neon and fluorescent lights; and intentional or unintentional interfering signals, and intermodulation noise. Noise is a real-world fact of life. Whenever a receiver is tuned to receive a signal on a particular frequency (or range of frequencies), whatever noise is present at those frequencies will enter the receiver along with the signal. Signal-to-noise ratio is thus an important factor in any communication system. In addition to signals (and noise) introduced into the wireless medium, distortions may also be introduced by hardware and software components that process the signals passing through them. Thus these hardware/software induced distortions also need to be taken into account.

The disclosed training system is designed to train a machine learning system, such as a neural network, so that it can identify and/or classify different signal emissions propagating through a medium—which as illustrated above, will certainly include distortions and perturbations associated with the path the signal takes, including any noise that will almost certainly be present. One important use case is to be able to identify and/or classify different modes and encodings of RF signals propagating through a space (channel) that includes imperfections, such as reflecting surfaces, refracting media and possibly the presence of interfering signals.

Figure 1:
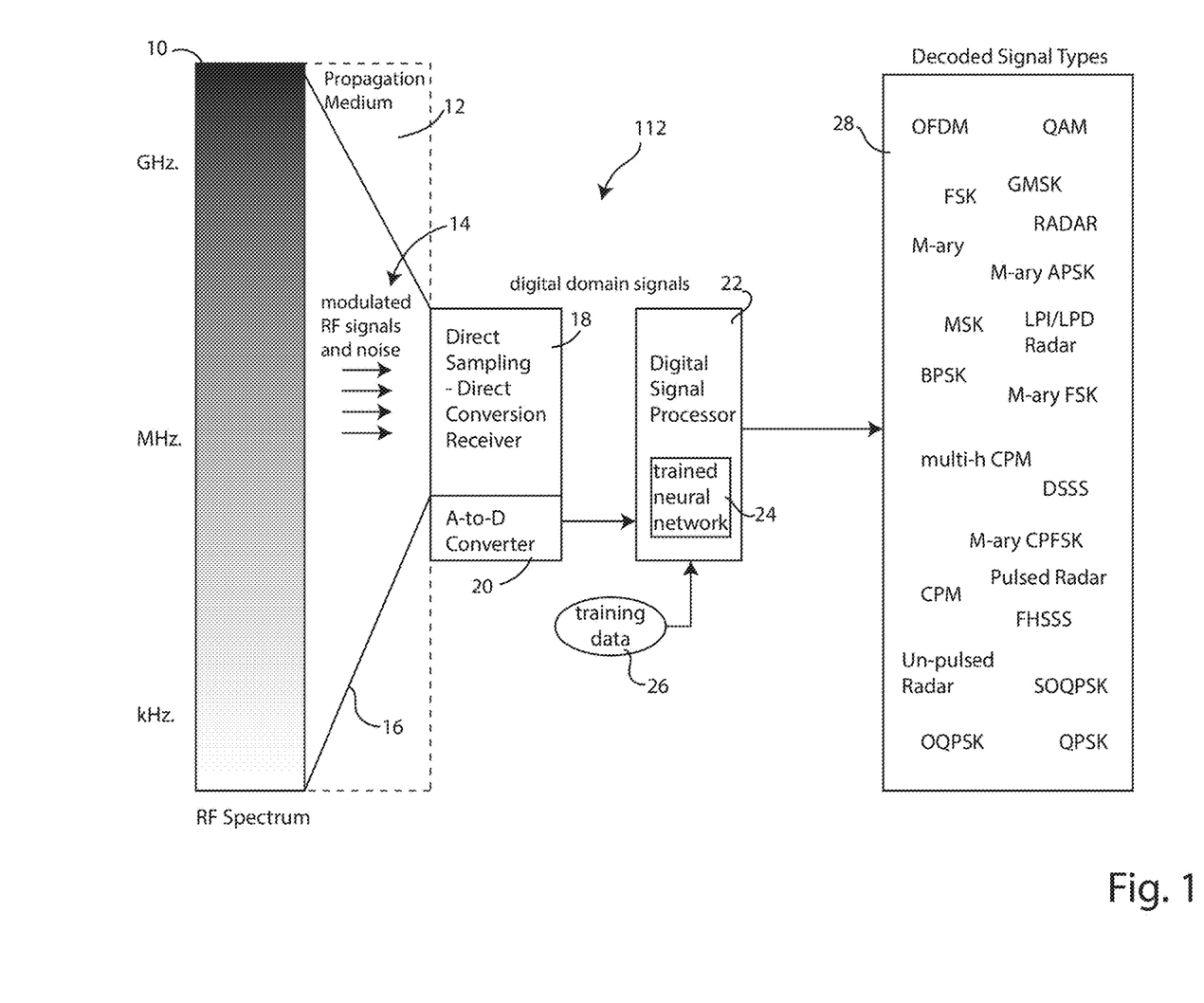
FIG. 1 is a block diagram illustrating how identification and classification of wireless signals is performed across a frequency spectrum, useful in understanding how the disclosed training system is useful.

While there are many uses for such a machine learning system, one exemplary signal identification and classification system has been illustrated in FIG. 1. This system is designed to receive a very wide swath of the radio frequency spectrum, illustrated at 10. This spectrum may range in frequency from kilohertz (kHz.), through megahertz (mHz.), to gigahertz (gHz.), all propagating through a propagation medium, shown diagrammatically at 12. In a real-world application, the propagation medium will comprise regions of free space, and other regions containing reflective, refractive, diffractive and absorptive structures, such as buildings, vehicles, land masses, salt-water oceans, fresh water lakes, clouds and quite possibly ionized regions of the Earth's atmosphere. At any given time the frequency spectrum 10 will be filled with numerous different types of modulated signals, based on any number of different analog and digital encoding schemes. Additionally noise will be present.

The modulated signals and noise gathered from the swath of radio frequency spectrum 10 is shown diagrammatically at 14. These signals and noise are captured by a suitable antenna system, shown diagrammatically at 16 and fed to a receiver 18. In the illustrated embodiment, the receiver 18 is a direct sampling, or direct conversion receiver that digitizes the incoming modulated signals and noise 14 using analog-to-digital conversion circuitry 20, feeding the digitized data representing the entire swath of radio frequency spectrum (or large portions of it) to a digital signal processor (DSP) 22. The ability to convert the radio frequency spectrum directly into digital data depends on having an analog-to-digital circuit capable of sampling the relevant frequencies according to the Nyquist criteria. In this regard, analog-to-digital technology continues to advance, allowing higher and higher frequencies to be digitized directly. Where direct digitization is not feasible, due to Nyquist criteria requirements, the incoming radio frequency spectrum can be down converted by mixing the incoming signal with a local oscillator, resulting in a baseband signal that is within the ability of the existing analog-to-digital technology.

Once the incoming signals are placed into the digital domain, the digital signal processor 22 then decodes each of the signals found, based on having been programmed in advance to apply the appropriate decoding algorithm or codec. In FIG. 1, these decoded signals are illustrated diagrammatically at 28. However, in order to know which codec to apply to a given data stream, the digital signal processor 22 must first (a) identify the data stream as potentially containing decodable information and (b) classify the data stream so as to know what encoding has been used (and thus what decoding algorithm is needed). These represent the basic identification and classification processes.

Beyond this basic identification and classification, there are many additional aspects that may need to be handled. For example, in the case of modulation classification, this step classifies the modulation type and, in some cases, the modulation order (i.e., the number of bits per symbol). In the case of radar, the classification determines the radar type. In this regard, radar comes in a variety of configurations in emitter, receiver and antenna, and in a variety of wavelengths, scan strategies, etc. Radar types thus include examples such as bistatic radar, continuous-wave radar, doppler radar, FM-CW radar, monopulse radar, passive radar, planar array radar, pulse-doppler radar, and the like. In addition, metadata, such as bandwidth, center frequency, duration, dwell time, periodicity, etc., when combined with modulation classification (i.e, type of modulation) helps to identify the particular signal source. In this way, signal identification and classification can become quite refined, enabling a particular signal source to be identified as belonging to standards like LTE, 3G, 4G, 4G commercial signals and WiFi; and also the national origin of the signal, by way of example: French radar, Chinese military communications, Russian jammers, and the like.

Although various different receiver technology may be used to implement the receiver portion of the system described above, one well suited technology is based on the SignalEye spectrum situational awareness system available from General Dynamics Mission Systems, Fairfax, Va. Other suitable technology may be based on a cognitive RF front-end control (CogRF) design that provides a tunable radio frequency front end that uses artificial intelligence, such as a trained neural network.

In the illustrated embodiment, the digital signal processor 22 has been programmed to include, or is coupled to an external circuit that includes, a machine learning system 24, such as a trained neural network 24 that has been trained a priori using a learning algorithm that is fed with training data 26 representing suitable examples of all different modulation and encoding schemes that the digital signal processor 22 is configured to decode. The disclosed training system is designed to provide this training data 26. In some cases, a machine learning algorithm, based on the trained data, can also learn signals that aren't in the expected or known signal types, whereby the machine learning algorithm learns new signal types, perhaps from an unsupervised learning methodology. Alternatively, the neural network may be trained using a supervised and/or semi-supervised methodology.

As with any machine learning system, good training data is key to having a robust system. An objective of the system illustrated in FIG. 1 is to be able to identify and classify a range of different types of transmissions, i.e., different frequencies, different modes, different bandwidths, different modulation and encoding. Thus the training data needs to provide good examples of each of these transmission types. In the disclosed training system, a processor controlled signal generator system is used to emulate a wide variety of different training generators. While actual RF generators (transmitters), could be used to create a set of different types of transmissions, the easier way to implement this is to generate the signals digitally (e.g., via synthesized means). A sufficiently wide range of samples for training signals would be represented by hundreds of thousands of variations of each signal type, with imperfections and perturbations induced on each training vector representative of real-life distortions.

Figure 2:
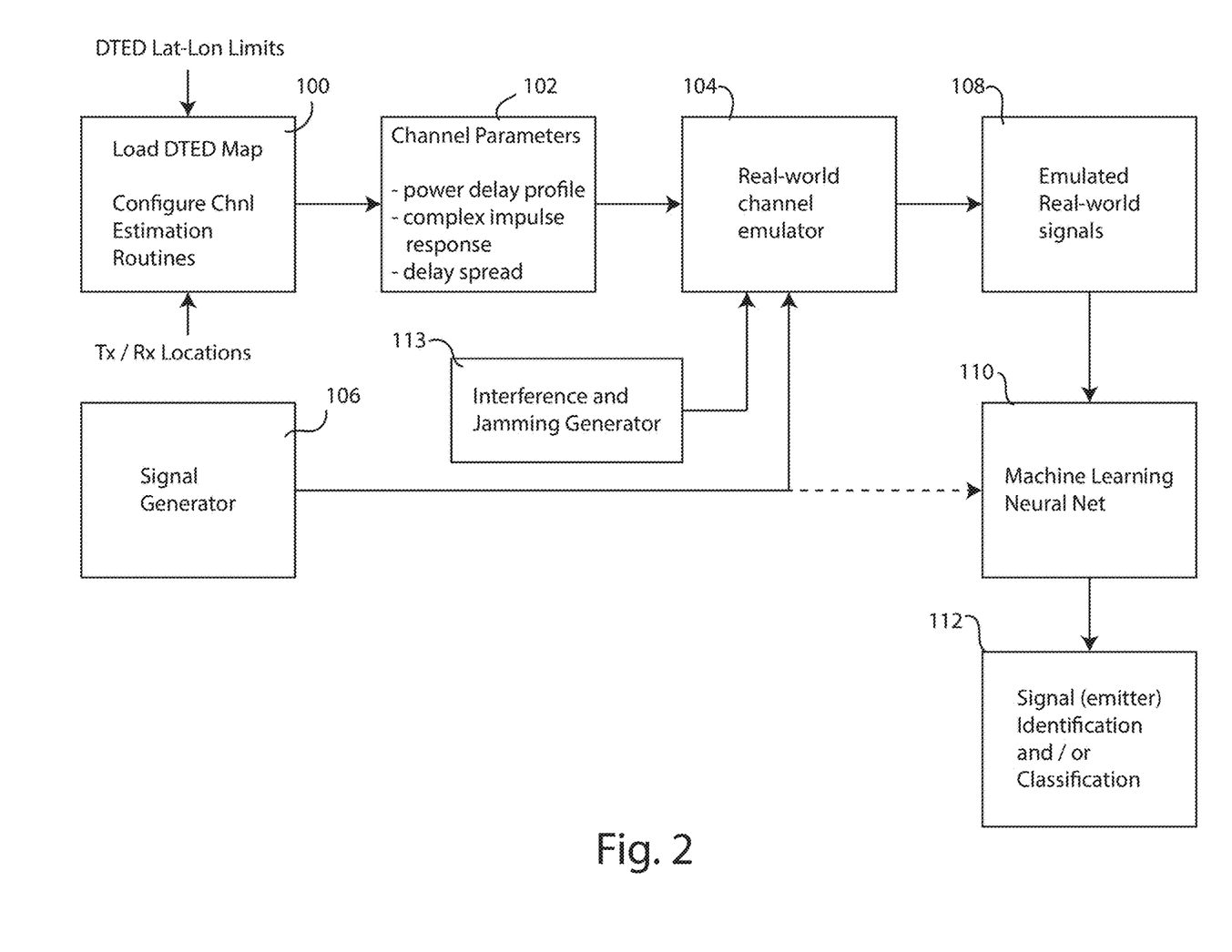
FIG. 2 is a block diagram explaining the basic structure of the disclosed machine learning training system for identification or classification of wireless signals.

FIG. 2 shows the basic structure of the disclosed machine learning training system for identification or classification of wireless signals. The training system simulates channel perturbations by using digital elevation map data, combined with environmental properties (such as absorption, diffusion, diffraction and reflection) using a channel simulation processor 100. The channel simulation processor is supplied with digital elevation map data, such as from digital terrain elevation data (DTED), available from the National Geospatial-Intelligence Agency. The resolution of the digital map data should be of sufficient resolution to appropriately distort the signal by accurately emulating a real-world over-the-air (OTA) transmission. If desired, processor 100 may be supplied with map data boundary limits (latitude-longitude limits) to reduce the size of the DTED data set to a relevant region of space for channel simulation. The channel simulation processor 100 is also supplied with the latitude-longitude coordinates of all transmitter and receiver locations that will be used for the channel simulation.

The simulation processor 100 uses ray tracing algorithms to determine how each signal transmitted from a particular transmitter traverses its route to a particular receiver, taking into account any absorption, diffusion, diffraction and reflection each ray encounters. A suitable ray tracing algorithm can be implemented using the Wireless InSite software package, available from Remcom Inc., State College, Pa. When the matrix of all transmitter and receiver pairs is processed by the ray tracing algorithm, a channel estimation matrix is produced. This matrix is then assessed by the parameter extraction processor 102, which compiles statistical data about the channel—producing a power delay profile and generating additional statistical parameters such as mean time of arrival, and delay spread. The parameter extraction processor 102 also generates a complex impulse response for the channel, comprising amplitude and phase information representing how a signal may be distorted as it passes through the space associated with the mapped region. When either or both of the transmitter and receiver are mobile, this produces a continuous evolution of different power delay profiles and statistical parameters that represent the channel environment over time and any changes in jamming and interference signals that the transmission would experience.

The parameters generated by the extraction processor 102 are then fed to the real-world channel emulator 104, which simulates a propagation medium through which synthesized signals from a signal generator 106, and optionally also from an interference and jamming generator 113,L are fed. The channel emulator 104 applies the parameterized distortions from the parameter extraction processor to signals produced by the generator to produce a stored set of emulated real-world signals 108. The signal generator 106 is capable of generating waveforms that simulate potentially all of the different modulated signal types for which the machine learning system 110 will be trained to identify or classify. The waveforms may be labeled by an associated identifier, making them suitable for supervised training. In one embodiment the machine learning system is implemented using a neural network, trained upon the emulated real-world signals 108 to define a trained recognizer 112 that can identify and/or classify actual emitted signals propagating through the space associated with the mapped region. The trained recognizer 112 might be used for example to define the trained neural network 24 used by the DSP 22 in FIG. 1 to decode real-world signals. The trained recognizer 112 provides the DSP 22 with a prediction about what encoding type a received signal is, allowing the DSP to select the appropriate codec for decoding the actual signal.

Figure 3:
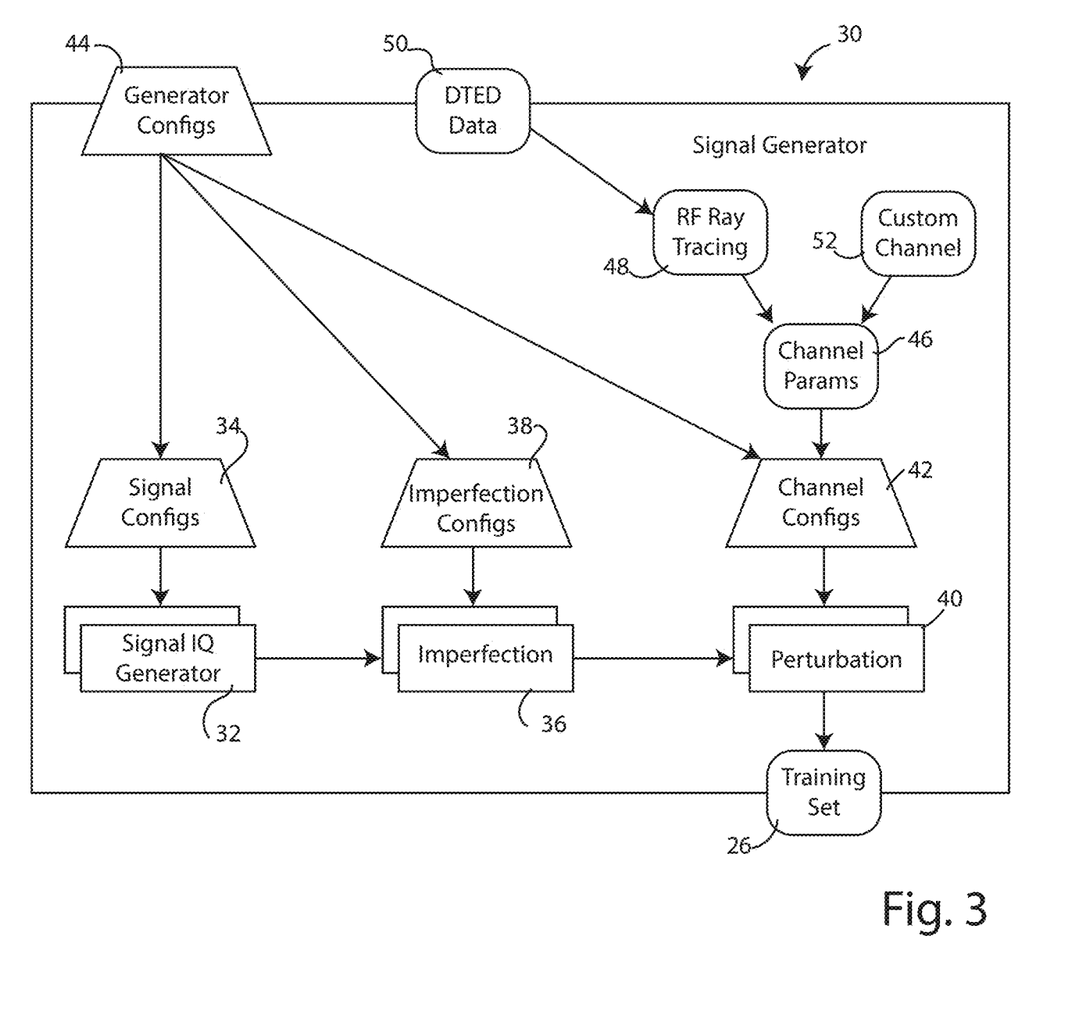
FIG. 3 is a block diagram of a training system signal generator that produces a set of training data used by the identification and classification system of FIG. 1.

An embodiment for generating the set of training data for training the machine learning system 110 is shown in greater detail at 30 in FIG. 3. This signal generator 30 produces a training set of training data 26 that is used to train the machine learning system 24 used by the DSP 22 in FIG. 1. The training system signal generator 30 produces the training set of training data 26 essentially by generating a simulated plurality of signals to represent each of the different types of transmissions the identification or classification system must be able to process. Typically these plurality of signals will represent wireless signals, such as radio frequency signals or SONAR signals that have been appropriately modulated according to the communication mode being simulated.

To generate the simulated wireless signals, the training system signal generator 30 includes a software-defined generator circuit 32 (or bank of software defined generator circuits) that are configured by signal configuration parameter data 34 to operate as signal generators capable of producing wireless signals having both in-phase (I) and quadrature (Q) components (if required for a certain simulation). In some cases it will also be necessary to generate I and Q samples that are not at baseband, but at multiple frequencies not at DC.

To make these simulated wireless signals more realistic, the training system signal generator 30 applies imperfections to the signals. Specifically, the signal from each different simulated radio frequency signal produced by the software defined generator circuit(s) 32 are altered by an imperfection simulation processor 36 based on imperfection configuration parameter data 38. While the range of imperfections can be quite broad, typical imperfection configuration parameters might include injecting slight frequency shifts, to simulate carrier frequency offsets and thermal drift present in some real-world transmitter oscillators, and inducing sampling rate mismatch or sampling rate offset (including coarse and fine timing offsets and/or shifts). In addition, Gaussian noise can be mixing generated signal to simulate interfering noise. Additionally other generated signals can be mixed with the primary signal to simulate jamming signals.

Essentially, the signal generation capability described above empowers the training system signal generator 30 to produce virtually any radio frequency signal that may be encountered in use by the identification and classification system of FIG. 1. This ability to generate the signals digitally extends to the ability to generate any kind of interfering signal that may be encountered, including noise sources, both natural and man-made, and intentionally broadcast jamming signals. These digitally generated signals may also be upconverted to various RF analog frequencies to represent analog transmissions from an actual transmitter, along with various nonlinearities in the transmitter and/or receiver.

Having been augmented or distorted with imperfections, each of the simulated radio frequency signals, is then digitally operated upon to a perturbation simulation processor 40 which simulates the distortions and perturbations caused by the channel or medium (including regions of free space) through which each simulated signal would pass in the real-world case. The perturbation simulation processor 40 uses channel configuration parameter data 42, which are based on terrain map data processed by ray tracing as will be described below.

In the illustrated embodiment, the respective signal configuration parameter data 34, the imperfection configuration parameter data 38 and the channel configuration parameter data 42 are programmatically controlled by a master generator configurations processor 44. This processor is responsible to ensure that each generated signal, from the software-defined generator circuit(s) 32, is manipulated using the proper imperfection configuration; and to ensure that the proper channel perturbation is properly applied to each to produce the training set of training data 26. Note that in order to properly apply perturbations and/or imperfections to the synthesized data, the signal must be converted to a sampling frequency sufficient to emulate the distortions that a real-world channel or interference source or jammer source would induce on the signal.

The channel configuration parameter data 42 are defined as a set or collection of channel parameters 46 that are selectively generated either by ray tracing analysis 48 of terrain data 50, such as digital terrain elevation data (DTED), or from custom channel parameters 52.

The training system thus models both sets of signal generators, to simulate different real-world transmitters, and the wireless or communication channel through which signals from these signal generators will propagate, thus simulating real-world wireless or communication channel conditions. Ray tracing of terrain data plays an important role in modeling the wireless or communication channel, by applying perturbation to what would otherwise be an (ideal) unimpeded line-of-site transmission medium. The training system uses DTED map data 50 with ray tracing algorithms to model the space between transmitter and receiver. This map data takes into account the presence of any hard or partially reflective surfaces, and potentially any signal attenuating objects, such as a grove of trees. The map-based ray tracing model is frequency dependent. Each ray-traced signal path from transmitter source location to receiver destination location undergoes whatever reflection, refraction and absorption perturbations are present in the path, based on the DTED map data 50. The DTED map data contains elevation information. Thus the signal path perturbations may be calculated not only for ground station to ground station communications, but also air to ground or satellite to ground communications.

The DTED map data 50 are useful for modeling perturbations caused by Earth terrain, vegetation and man-made structures. If desired, additional models may be employed to model atmospheric conditions that may affect propagation of certain classes of signals. In this regard, solar ionization of the ionosphere will produce absorption layers and refractive layers, which can have very complex time-varying qualities, that produce signal fading, polarization shifting and changes in skip angle. At some frequencies, atmospheric moisture and wind patterns can also perturb the signal, as well as other atmospheric conditions, like tropospheric conditions). All of these perturbations can be modeled.

Figure 4:
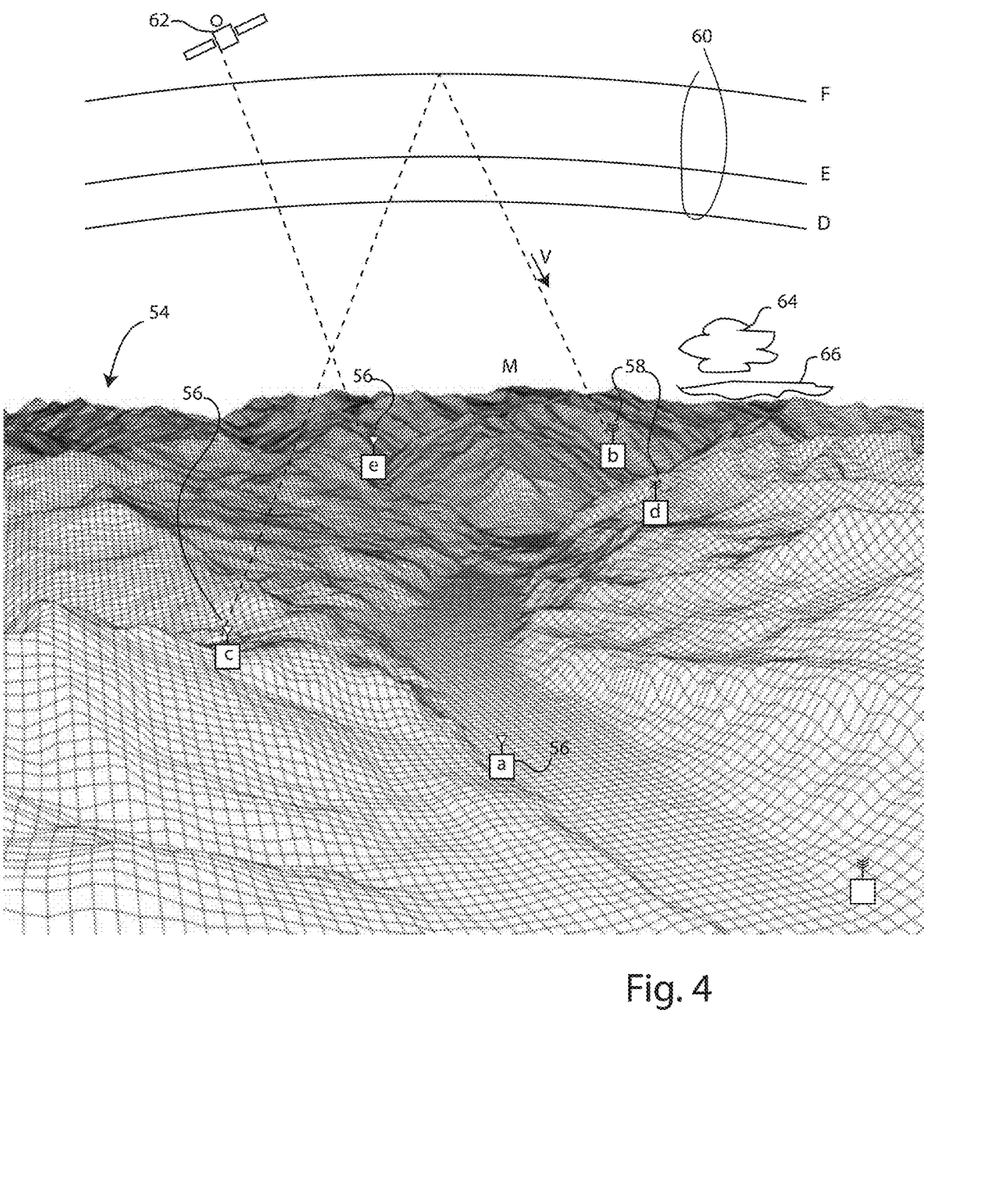
FIG. 4 illustrates a grid map of terrain data, featuring exemplary transmitters and receivers and other propagation channel perturbing features, useful in understanding how the disclosed training system simulates various channel configurations.

To illustrate, refer to FIG. 4, which shows an exemplary region of three-dimensional terrain data, expressed as a rectangular grid map 54, which includes the locations of various radio fixed base transmitters 56 located at points in the terrain where an actual transmitter is known to be located, or at simulated locations 58 where mobile transmitters may be located. Although the grid map 54 illustrated in FIG. 4 represents rugged rural terrain with river bed but few buildings, it should be appreciated that the grid map 54 of an urban location would be populated with many buildings.

The ray tracing algorithm 48 essentially generates a plurality path vectors (rays) each originating from a given transmitter point of origin and extending in all directions (i.e., radiating spherically outwardly). The ray tracing algorithm 48 is provided with a map data file 50 containing detailed records of the location and nature of different object located within a three-dimensional space (or four-dimensional space, including time) through which each ray will propagate. The algorithm essentially follows the path of each ray, and simulates every change in direction, change in phase, or loss of signal intensity experienced by that ray as it propagates.

Each time a ray intersects with an object in its path, the direction of the vector may potentially be altered, and the energy represented by the vector may be attenuated. For example, if the ray intersects with a reflective object, such as a building, the ray changes direction (and also possibly phase), typically such that the angle of the reflected ray (measured with respect to a line normal to the surface of the object) is equal to the angle of the incident ray (similarly measured). If the ray intersects with a boundary between media having different refractive properties, the ray changes direction according to the ratio of the electromagnetic wave propagation velocities through the respective media. If the ray passes through an absorptive region the ray will lose intensity by giving up energy to the atoms of the absorptive medium, possibly without change in direction. Even without passing through absorptive regions, all rays lose intensity as a natural consequence of propagating across the distance between source and destination—propagating wave fronts lose intensity according to the square of the distance traveled.

The ray tracing algorithm 48 maintains a matrix record of each direction change and each intensity loss for each ray traced. Using this matrix record, the arrival direction, arrival time, phase and signal intensity of electromagnetic energy can be predicted, for each different point within the space represented by map data file 50. Referring to FIG. 4, a ground wave signal propagating from station 56*a* to 58*b* might include signals reflecting from the face of mountain M. A line-of-sight signal from station 56*a* to 58*d* might be largely free from reflections. A skywave signal from station 56*c* refracting from the F layer of the ionosphere would appear to station 58*b* as having originated from the sky along vector path V. This refracted signal would be reduced in intensity both due to the distance traveled and also possibly due to absorption by ions within the ionosphere, notably the D layer. A line-of-sight signal from satellite 62 to station 56*e* will likewise experience loss in intensity due to the distance traveled and possibly due to absorption by ions within the ionosphere. Atmospheric moisture 64 and dust 66 can also reduce the intensity of signals passing through.

The ray tracing algorithm is a valuable tool in determining how a signal transmitted from point A will be received by a station at point B. However, the disclosed training system uses the ray tracing algorithm for the additional purpose of constructing a simulated prediction of how the propagation medium behaves. In other words, the ray tracing algorithm can simulate what perturbation effects will be felt by different signals passing through the modeled space. Instead of performing the ray tracing algorithm for a singular point, the ray tracing algorithm is run across a multitude of points within the entire space represented by the map data. In this way channel configuration parameter data 42 (FIG. 3) are generated for the entire space by the perturbation simulation processor 40 (FIG. 3). If desired, the space represented by the map data can be analyzed using generated impulse stimuli (i.e., infinitesimally short excitation bursts) to produce a complex (magnitude and phase) impulse response of the propagation channel. While the disclosure details the method of synthesizing (or emulating) a real-world channel environment, actual real-world channel measurements could also be done by sending a channel sounding signal from the transmitter sites to multiple receiver sites as a way to determine the power delay profiles as well.

Figure 5A:
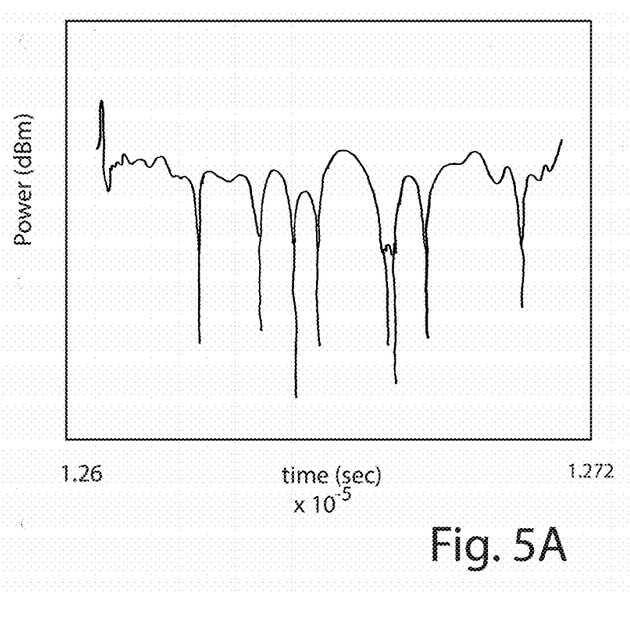
FIGS. 5A and 5B depict exemplary power delay profiles for different exemplary transmitter-receiver pairs, useful in understanding how the disclosed training system models and simulates different channel perturbations.
Figure 5B:
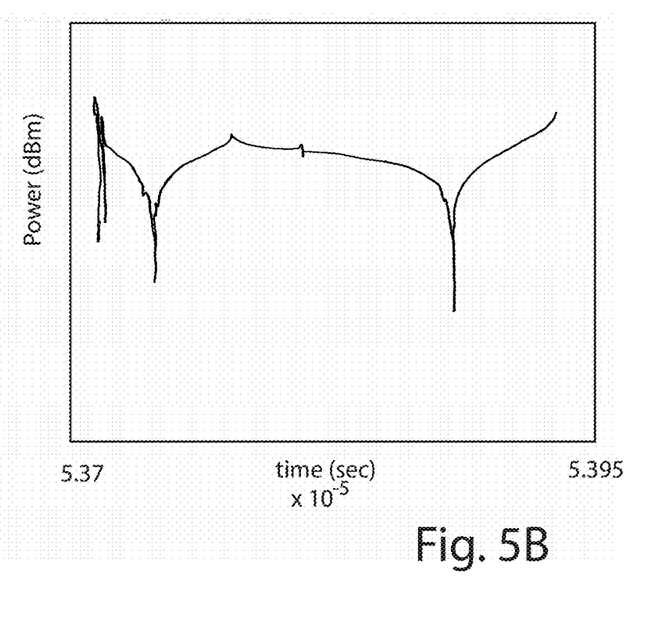

While perturbation simulations can be used to generate perturbation data expressed in numerous different forms, the illustrated embodiment generates power delay profiles for a plurality of different signal paths between a transmitter (emitter site) and a receiver (Rx site). Power delay profiles are expressed in terms of the power (in dBm) at the Rx site as a function of time, for a given emitter site. The power delay profiles are stored as part of the channel configuration parameter data 42 (FIG. 3) as digital data, which may be graphed as illustrated in FIGS. 5A and 5B. For each emitter-receiver site pair, the data may be statistically analyzed to extract additional parameters such as the signal mean time of arrival (mean TOA), and the delay spread. In the exemplary power delay profiles shown in FIGS. 5A and 5B, the mean time arrival and delay spread parameters are as follows:

| Parameter | FIG. 5A | FIG. 5B |
| --- | --- | --- |
| Mean TOA | 0.12633E−04 | 0.63770E−04 |
| Delay Spread | 0.31629E−07 | 0.86883E−07 |

It will be appreciated that the above values are calculated from the data from which the power delay profile curves were generated to produce the exemplary graphs in FIGS. 5A and 5B. Thus these values are intended for illustration purposes only.

Figure 6:
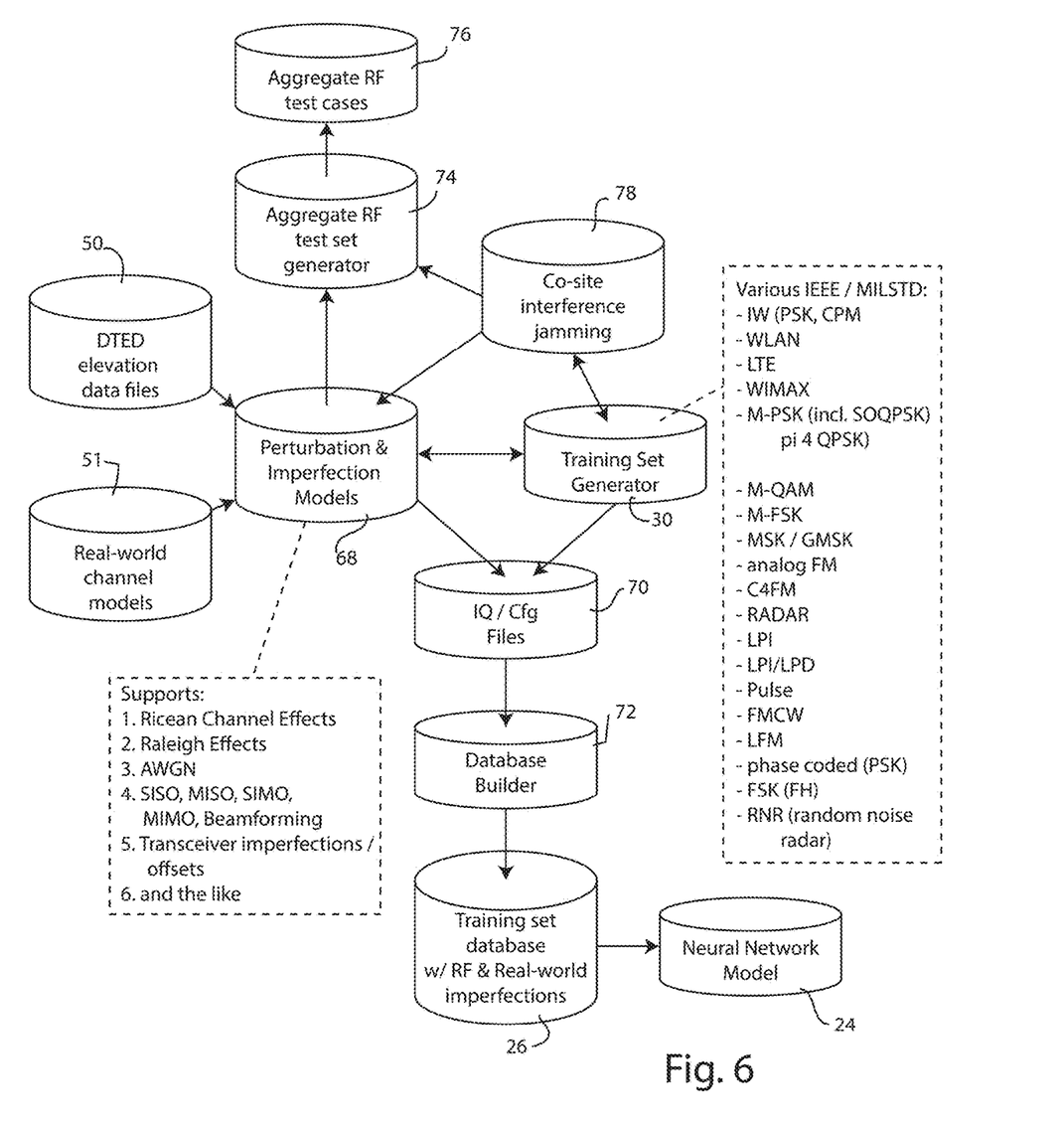
FIG. 6 is a data flow diagram showing the process for producing synthetic data, including jamming signals.

FIG. 6 illustrates a more full-featured embodiment of the training system that generates not only a set of training data 26 used to train the machine learning system (e.g., neural network model) 24, but also a set of aggregate radio frequency (RF) test cases 76 that are used in testing the machine learning system 24. Testing of a machine learning system is a common operation during development. After the machine learning system is trained using one set of data (training data), the trained system is then tested using a different set of data (testing data) to confirm the actual predictive power of the machine learning system.

As with the previously discussed embodiment, the embodiment illustrated in FIG. 6 uses both perturbation and imperfection models, which are shown collectively at 68. For comparative reference, FIG. 3 shows these two models separately at 36 and 40. The perturbation and imperfection models 68 are generated using terrain data 50, such as data based on DTED elevation data files. In addition, the models 68 may also include other data sources, such as real-world channel models 51. Whereas the terrain data files are synthesized using the ray tracing algorithm 52, the real-world channel models are developed using actual signal measurements: sending a known transmission from a transmitter at a first location and receiving the transmission at a second location and parametrizing how the sent and received signals differ.

The perturbation and imperfection models 68 are supplied along with data from the training set generator 30 to produce the generator IQ files and configuration files (shown collectively at 70) that define how the training data will be created. For comparative reference, the IQ and configuration files 70 correspond to the signal configuration parameter data 34, the imperfection configuration parameter data 38 and the channel configuration parameter data 42 shown in FIG. 3. These data are supplied to a database builder 72 (FIG. 6) which generates the training set 26. For comparative reference, the database builder 72 uses the services of the signal IQ generator 32, imperfection simulation processor 36 and perturbation processor 40, all shown in FIG. 3. For illustration purposes, FIG. 6 lists some of the possible signal modulation and encoding types that generator 30 may be configured to simulate.

The perturbation and imperfection models 68 may also be used to generate the aggregate RF test cases 76, using the aggregate RF test set generator 74, which works in essentially the same fashion as the generator system 30 of FIG. 3, except that different signal paths and/or different propagation conditions are chosen, so that the test data set is different from the training data set. For illustration purposes, FIG. 6 lists some of the perturbation and imperfection models 68 that an embodiment may be configured to implement.

If desired, both the training data set and the test data set can be generated with additional input from a signal source representing co-site interference or jamming 78. In this regard, an interference or interfering signal may be a noise source that models naturally occurring electrical interference and noise. The interfering signal may also be a signal source that models unintentionally produced man-made interference, such as oscillator phase noise or intermodulation distortion; or the interfering signal may model intentionally produced jamming signals, such as signals intended to overload a receiver or provide it with false information.

Figure 7:
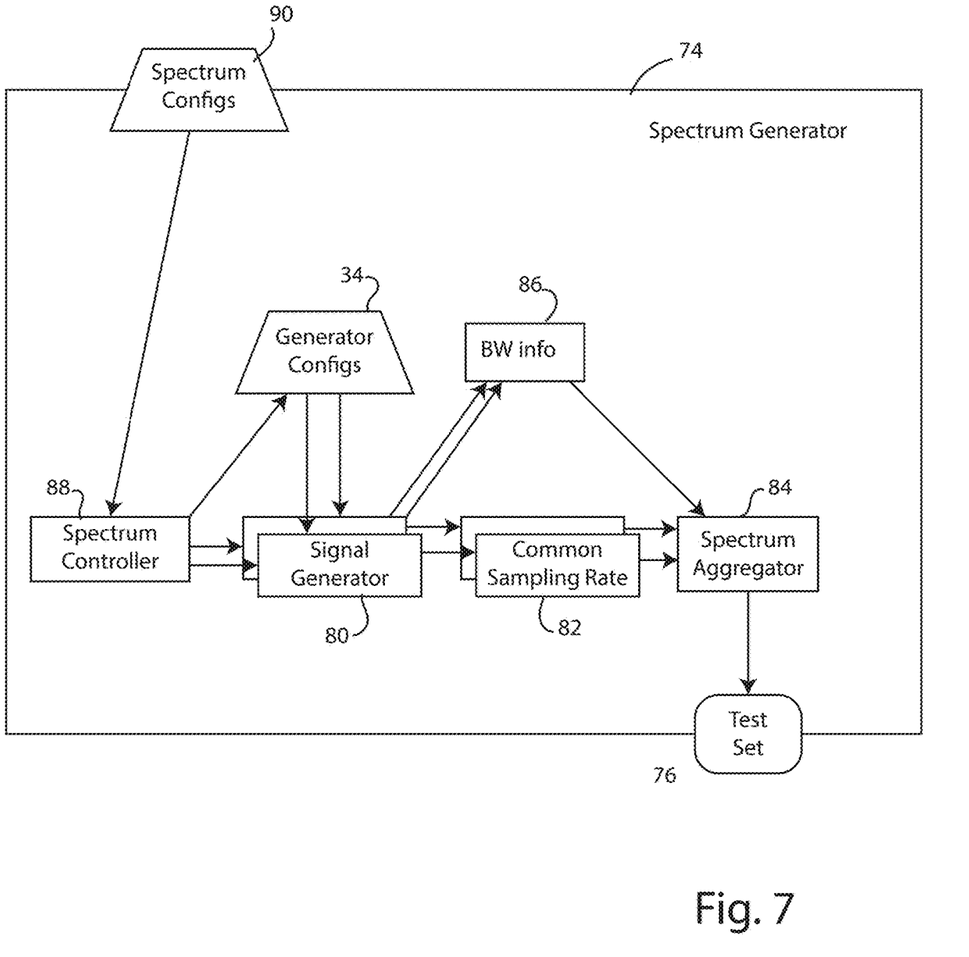
FIG. 7 is a block diagram illustrating how to aggregate simulated signals to represent a spectrum test set.

Referring now to FIG. 7, shown is an embodiment of an aggregate RF test set generator 74 that is designed to produce a test set 76 by aggregating a plurality of signal generators 80, sampled at different sampling rates and organized into groups of common sampling rate 82. A spectrum aggregator processor 84 assigns the groups of signals across a predefined spectrum, such as the spectrum 10 (FIG. 1). To do so, the spectrum aggregator 84 uses bandwidth (BW) information 86 provided by the respective signal generators 80. As illustrated, each of the generators 80 produces its generated signal using generator configuration data 34, telling the generator 80 what type of modulation and encoding to use. The generators 80 are each assigned to a particular frequency by a spectrum controller 88 operating based on spectrum configuration parameter data 90.

Figure 8:
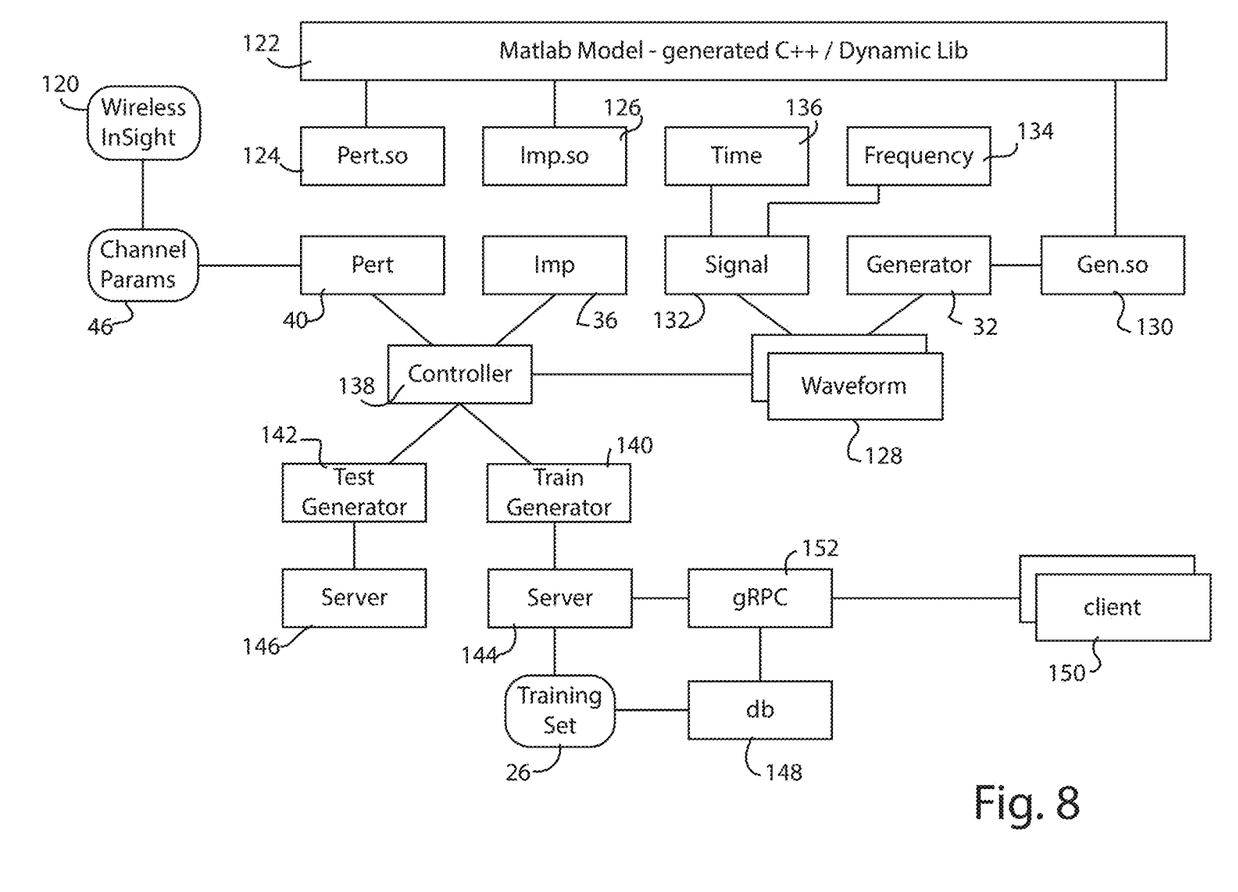
FIG. 8 is a block diagram illustrating a multi-processor, multi-generator embodiment of the disclosed system.

In addition to the embodiments discussed above, it is also possible to implement the disclosed training system using specially programmed computers. FIG. 8 depicts such a computer-implemented embodiment based in-part on the MATLAB software suite, available from The MathWorks, Inc., Natick, Mass. The MATLAB software when run on a suitable computer, such as a desktop computer or workstation, allows simulation of the circuits discussed above as modules which are then compiled into computer code using generated C++ and Matlab dynamic libraries. The generated code is then run on a suitable computer or computer system.

Referring to FIG. 8, the channel parameters 46 (also depicted in FIG. 3) are generated using ray tracing software 120 running on a suitable computer. For this purpose the Wireless InSite 3D wireless prediction software may be employed. The Wireless InSite software is available from Remcom Inc., State College, Pa. The channel parameters 46 are fed to the perturbation simulation processor 40, which in this embodiment is implemented using the Matlab software suite 122 to generate a perturbation shared object code 124. In a similar fashion, the imperfection simulation processor 36 is generated using shared object code 126 produced using the Matlab software suite. If desired, the perturbation and imperfection simulations can include simulations of hardware and/or software distortions to the signal, representative of any system the signal passes through in route. In most cases, the signal passes through not only a wireless medium, but also through electronic systems that can impart distortions which should be captured in the training sets.

A set of waveform files 128 is generated by the signal generator 32, the signal generator being likewise built from shared object code 130 using the Matlab software suite 122. The individual waveforms files comprising the waveform set 128 comprise signal data signal data 132 used to modulate the radio frequency carrier signals generated by the generator 32. These signal data 132 are in-turn based on frequency data 134 and time data 136 to produce simulations of the real-world encoded signals for which the machine learning system will be trained.

The waveform set 128 are operated on by a controller processor 138 that subjects the individual waveforms to perturbations and imperfections in the simulated channels and transmitters, respectively. The controller processor 138 supplies its output to both the training data set generator 140 and the test generator 142. Preferably, as discussed above, the training data and test data should be different. Each of the training generator 140 and the test generator 142 are hosted by servers 144 and 146, respectively. The test generator 140 will typically be used during the development process, to test or confirm the actual predictive power of the machine learning system.

The training generator server 144 supplies the training set 26 to a database 148, hosted on server 144 or elsewhere if desired. The training set 26 is used for training a machine learning system, such as a trained neural network. If desired, the training set 26 can be made available to allow other clients 150 to utilize the training set 26 (e.g., for use in additional machine learning training) through a suitable connection to server 144 and database 148. Illustrated in FIG. 8, a remote procedure call (RPC) application program interface 152, such as the gRPC application program interface is implemented on the server, allowing clients 150 to operate certain aspects of the training generator 140 without requiring hardwired access to the generator. If desired, the RPC interface 152 can be configured to allow a client to make changes to the parameters used to generate the training set 26 for that client's particular purpose or requirements. Also if desired, the test generator 142 may also be provided with a similar RPC application program interface.

From the foregoing, the disclosed training system (for machine learning in wireless signal identification or classification applications) applies synthesized and/or measured data (over the air or at any modem baseband, intermediate frequency (IF) or radio frequency (RF) reception port) to analyze, estimate and/or predict the channel properties in any deployed application environment.

While real-world received data can be used as a training dataset to help the machine learning neural network learn the various signal types and channel distortions for classification purposes, it is intractable to acquire measured data for every intended or desired operating environment. Thus the disclosed system enables any neural network and any application of measured or synthesized data to be emulated in any intended or desired operating environment.

The real-world perturbations of the channel can be comprised of any transmit-to-receive perturbation, such as sample rate mismatch (fractional and frequency errors), carrier frequency offset, Doppler and Doppler rate shifts, fine or coarse timing offsets and/or shifts, oscillator or clock drift, etc., in-phase and quadrature transmit or receive chain gain and phase mismatches, time and frequency channel fading, channel and/or receiver noise/jamming/interference perturbations and any other single-input-single-output (SISO), single-input-multiple-output (SIMO), multiple-input-single-output (MISO), and multiple-input-multiple-output (MIMO) channel disturbances.

Training and/or testing data sets can then be created using the measured and/or synthesized data and passed through the real-world channel perturbation emulator. The resulting training and/or testing data sets are then used to create the weights in any neural network that will then be used to identify and/or classify modulations (such as BPSK, QPSK, OQPSK, SOQPSK, M-ary PSK, M-ary QAM, M-ary APSK, GMSK, MSK, M-ary CPFSK, CPM, multi-h CPM, OFDM, DSSS, FHSS, any radar signals, etc.). By using the real-world perturbations, the neural network is able to identify and/or classify these modulation types with a more robust and improved accuracy compared to existing conventional approaches.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. An apparatus to train a machine learning system to identify and/or classify at least one wireless signal of the type having at predefined signal encoding scheme, comprising:
    a signal generator that outputs a reference signal corresponding to the at least one wireless signal according to the predefined signal encoding;
    a channel synthesizer processor programmed to:
        ingest map elevation data;
        reference a transmitter and a receiver to the map elevation data; and
        perform ray tracing of a representative signal between the transmitter and the receiver, while applying at least one predetermined perturbation property to synthesize at least one channel parameter; and
    a channel emulator processor programmed to use the at least one synthesized channel parameter and the reference signal to produce and store a perturbed signal as data for training the machine learning system.

2. The apparatus of claim 1 wherein the signal generator further includes an imperfection signal processor programmed to distort the reference signal according to at least one predetermined imperfection criterion.

3. The apparatus of claim 2 wherein the at least one predetermined imperfection criterion is selected from the group consisting of frequency shift, carrier frequency offset shift, coarse and/or fine timing offsets/shifts, oscillator and/or clock drift, thermal drift, extraneous noise, jamming signals, Gaussian noise, phase noise, intermodulation distortion, sampling rate mismatch, Doppler shift, Doppler rate shift, in-phase and quadrature mismatch, linear and/or non-linear filtering effects and combinations thereof.

4. The apparatus of claim 1 wherein the signal generator outputs a reference signal according to a predefined signal encoding selected from the group consisting of BPSK, QPSK, OQPSK, SOQPSK, M-ary PSK, M-ary QAM, M-ary APSK, GMSK, MSK, M-ary CPFSK, CPM, multi-h CPM, OFDM, DSSS, FHSS and radar signals.

5. The apparatus of claim 1 wherein the channel emulator processor is programmed to use the at least one channel parameter and the reference signal to produce and store:
    a first set of perturbed signal data for training the machine learning system; and
    a second set of perturbed signal data, different from the first set of perturbed signal data, for testing an artificial intelligence system used to classify signals.

6. The apparatus of claim 1 wherein the at least one predetermined perturbation property is selected from the group consisting of diffusion, diffraction, reflection and absorption.

7. The apparatus of claim 1 wherein the channel synthesizer processor produces the at least one channel parameter selected from the group consisting of power delay profile, delay spread, complex impulse response, mean time of arrival and combinations thereof.

8. The apparatus of claim 1 wherein the channel emulator processor is further programmed to ingest real-world measured signal data for use together with the at least one synthesized channel parameter in producing and storing the perturbed signal.

9. The apparatus of claim 1 wherein the channel emulator processor is further programmed to ingest real-world measured signal data, perturbed by real-world measured channel distortions, for use together with the at least one synthesized channel parameter in producing and storing the perturbed signal.

10. The apparatus of claim 1 wherein the channel emulator processor is further programmed to ingest real-world measured signal data, perturbed by real-world measured channel distortions and further perturbed by the at least one predetermined perturbation property, for use in producing and storing the perturbed signal.

11. A method for training a machine learning system to identify and/or classify at least one wireless signal of the type having at predefined modulation encoding scheme, comprising:
generating a reference signal corresponding to the at least one wireless signal according to the predefined modulation encoding;
synthesizing at least one synthesized channel parameter through processor computation by:
ingesting map elevation data;
referencing a transmitter and a receiver to the map elevation data; and
performing ray tracing of a representative signal between the transmitter and the receiver, while applying at least one predetermined perturbation property to synthesize at least one channel parameter; and
emulating a channel through processor computation by using the at least one synthesized channel parameter and the reference signal to produce and store a perturbed signal as data for training the machine learning system.

12. The method of claim 11 further comprising distorting the reference according to at least one predetermined imperfection criterion.

13. The method of claim 12 wherein the at least one predetermined imperfection criterion is selected from the group consisting of frequency shift, carrier frequency offset shift, coarse and/or fine timing offsets/shifts, oscillator and/or clock drift, thermal drift, extraneous noise, jamming signals, Gaussian noise, phase noise, intermodulation distortion, sampling rate mismatch, Doppler shift, Doppler rate shift, in-phase and quadrature mismatch, linear and/or non-linear filtering effects and combinations thereof.

14. The method of claim 11 wherein the reference signal is generated according to a predefined signal encoding selected from the group consisting of BPSK, QPSK, OQPSK, SOQPSK, M-ary PSK, M-ary QAM, M-ary APSK, GMSK, MSK, M-ary CPFSK, CPM, multi-h CPM, OFDM, DSSS, FHSS and radar signals.

15. The method of claim 11 wherein the at least one predetermined perturbation property is selected from the group consisting of diffusion, diffraction, reflection and absorption.

16. The method of claim 11 wherein the synthesized channel parameter is selected from the group consisting of power delay profile, delay spread, complex impulse response, and mean time of arrival.

17. The method of claim 11 further comprising ingesting real-world measured signal data for use together with the at least one synthesized channel parameter in producing and storing the perturbed signal.

18. The method of claim 11 further comprising ingesting real-world measured signal data, perturbed by real-world measured channel distortions, for use together with the at least one synthesized channel parameter in producing and storing the perturbed signal.

19. The method of claim 11 further comprising ingesting real-world measured signal data, perturbed by real-world measured channel distortions and further perturbed by the at least one predetermined perturbation property, for use in producing and storing the perturbed signal.

20. A method of modeling a signal channel comprising:
using a channel synthesizer processor to:
ingest map elevation data;
reference a transmitter and a receiver to the map elevation data; and
perform ray tracing of a representative signal between the transmitter and the receiver, while applying at least one predetermined perturbation property to synthesize at least one channel parameter; and
supplying the at least one synthesized channel parameter to a channel emulation processor programmed:
to receive an input signal; and
to perturb the input signal using the at least one synthesized channel parameter.

* * * * *